(12) United States Patent
Eckstedt

(10) Patent No.: US 7,108,093 B1
(45) Date of Patent: Sep. 19, 2006

(54) REAR MOUNTED ENGINE DESIGN WITH IMPROVED MAINTENANCE ACCESS FOR A MILITARY VEHICLE

(75) Inventor: Paul D. Eckstedt, San Jose, CA (US)

(73) Assignee: BAE Systems Land & Armaments L.P., Arlington, VA (US)

( * ) Notice: Subject to any disclaimer, the term of this patent is extended or adjusted under 35 U.S.C. 154(b) by 335 days.

(21) Appl. No.: 10/668,794

(22) Filed: Sep. 22, 2003

(51) Int. Cl.
B62D 25/10 (2006.01)

(52) U.S. Cl. .................. 180/89.17; 296/24.4; 296/37.1

(58) Field of Classification Search ............ 180/89.17, 180/89.1, 69.2, 69.24; 296/24.3, 24.4, 178, 296/179, 181.1, 37.1
See application file for complete search history.

(56) References Cited

U.S. PATENT DOCUMENTS

| 2,397,809 | A | * | 4/1946 | Dale et al. ................. 89/36.13 |
| 2,413,792 | A | * | 1/1947 | Sharp ......................... 180/69.2 |
| 2,854,085 | A | * | 9/1958 | Bachle ........................ 180/301 |
| 3,460,644 | A | | 8/1969 | Porsche et al. |
| 3,958,655 | A | | 5/1976 | Kronogard |
| 4,303,271 | A | | 12/1981 | Law |
| 4,319,653 | A | * | 3/1982 | Carlson ................... 180/89.17 |
| 4,349,080 | A | | 9/1982 | Brockmann |
| 4,554,989 | A | | 11/1985 | Gruich et al. |
| 5,029,918 | A | | 7/1991 | Albright et al. |
| 5,192,108 | A | * | 3/1993 | Richardson et al. ....... 296/37.1 |
| 5,752,862 | A | | 5/1998 | Mohler et al. |
| 6,173,482 | B1 | | 1/2001 | Riddle et al. |
| 6,584,881 | B1 | | 7/2003 | Boudreau et al. |
| D499,670 | S | | 12/2004 | Eckstedt |
| 6,866,108 | B1 | | 3/2005 | Borgwarth et al. |

FOREIGN PATENT DOCUMENTS

DE 004140508 A1 * 6/1993 ................ 296/37.1

* cited by examiner

Primary Examiner—Eric Culbreth
(74) Attorney, Agent, or Firm—Patterson, Thuente, Skaar & Christensen, P.A.

(57) ABSTRACT

A military vehicle with a turbine engine mounted on an outer rear corner of the vehicle, with the engine being installed in a vertical orientation in order to save critical space. The vehicle is provided with access hatches which enable operators to easily work on the engine and related power generation components. The positioning of the engine allows the crew of the vehicle to be shielded from the heat, noise, and exhaust of the engine. The rear positioning of the engine also provides improved survivability of the engine, as well as a reduced heat signature for the vehicle. Finally, the unique engine placement provides easy access for maintenance and removal of components or component modules.

10 Claims, 2 Drawing Sheets

REAR MOUNTED ENGINE DESIGN WITH IMPROVED MAINTENANCE ACCESS FOR A MILITARY VEHICLE

BACKGROUND OF THE INVENTION

1. Field of the Invention

The present invention relates generally to military vehicles, and more particularly is a vehicle with a vertically mounted turbine engine situated at the rear end of the vehicle.

2. Description of the Prior Art

Current art vehicles most often have a front end, horizontally mounted engine. The frontal location exposes the engine to greater hazards, and exposes the crew of the vehicle to the noise and exhaust of the engine. To work on the engine, access is gained through an access hatch in the top of the vehicle. The operator therefore either has to reach into the hatch and work, or hoist out the engine if large repairs are needed.

In current art vehicles, the engine is mounted in the main part of the vehicle hull. This is true whether the engine is mounted in the front, back, or middle of the vehicle. Often, the operator has to enter the vehicle interior in order to perform maintenance or repairs. Because of the need for at least some protection of the engine, access is often limited.

Finally, the horizontal configuration of current art engines requires a significant amount of space for the power plant.

Accordingly, it is an object of the present invention to provide a vehicle with a turbine engine that is mounted on a rear corner of the vehicle.

It is another object of the present invention to provide a vehicle design that separates the crew from the noise, heat and exhaust of the engine.

It is still another object of the present invention to provide a vehicle with improved protection for the engine and associated components.

It is yet another object of the present invention to provide a vehicle with direct access to the engine for maintenance and repairs.

SUMMARY OF THE INVENTION

The present invention is a military vehicle with a turbine engine mounted on an outer rear corner of the vehicle. The engine is installed in a vertical orientation in order to save critical space. The vehicle is provided with access hatches which enable operators to easily work on the engine and related power generation components. The positioning of the engine allows the crew of the vehicle to be shielded from the heat, noise, and exhaust of the engine. The rear positioning of the engine also provides improved survivability of the engine, as well as a reduced heat signature for the vehicle. Finally, the unique engine placement provides easy access for maintenance and removal of components or component modules.

An advantage of the present invention is that the positioning and orientation of the engine reduces space requirements.

Another advantage of the present invention is that the crew of the vehicle is isolated from the engine, which is particularly important in view of the presence of high speed turbine components.

A still further advantage of the present invention is that access to the engine is greatly improved.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
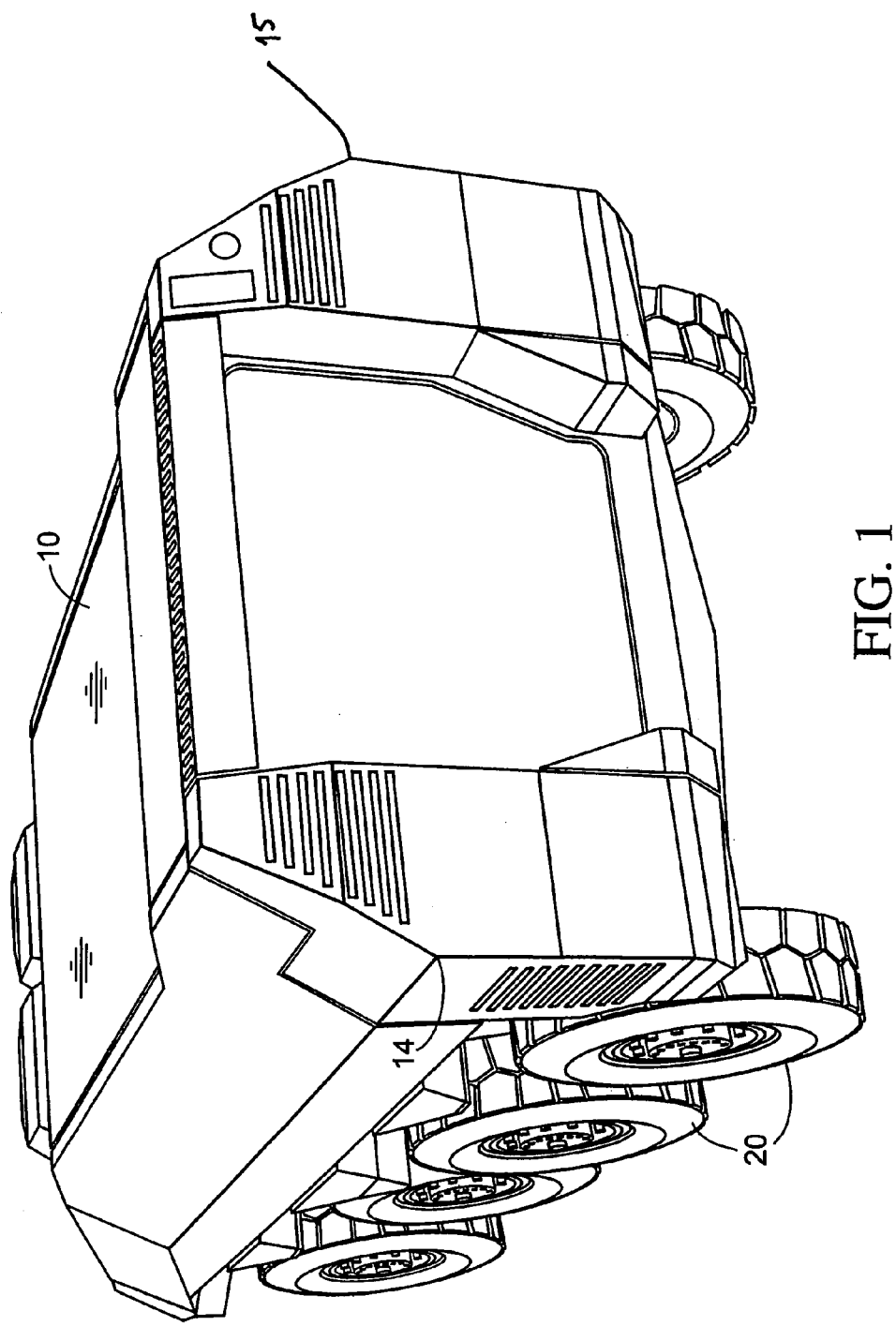
FIG. 1 is a rear perspective view of a military vehicle constructed according to the present invention.
Figure 2:
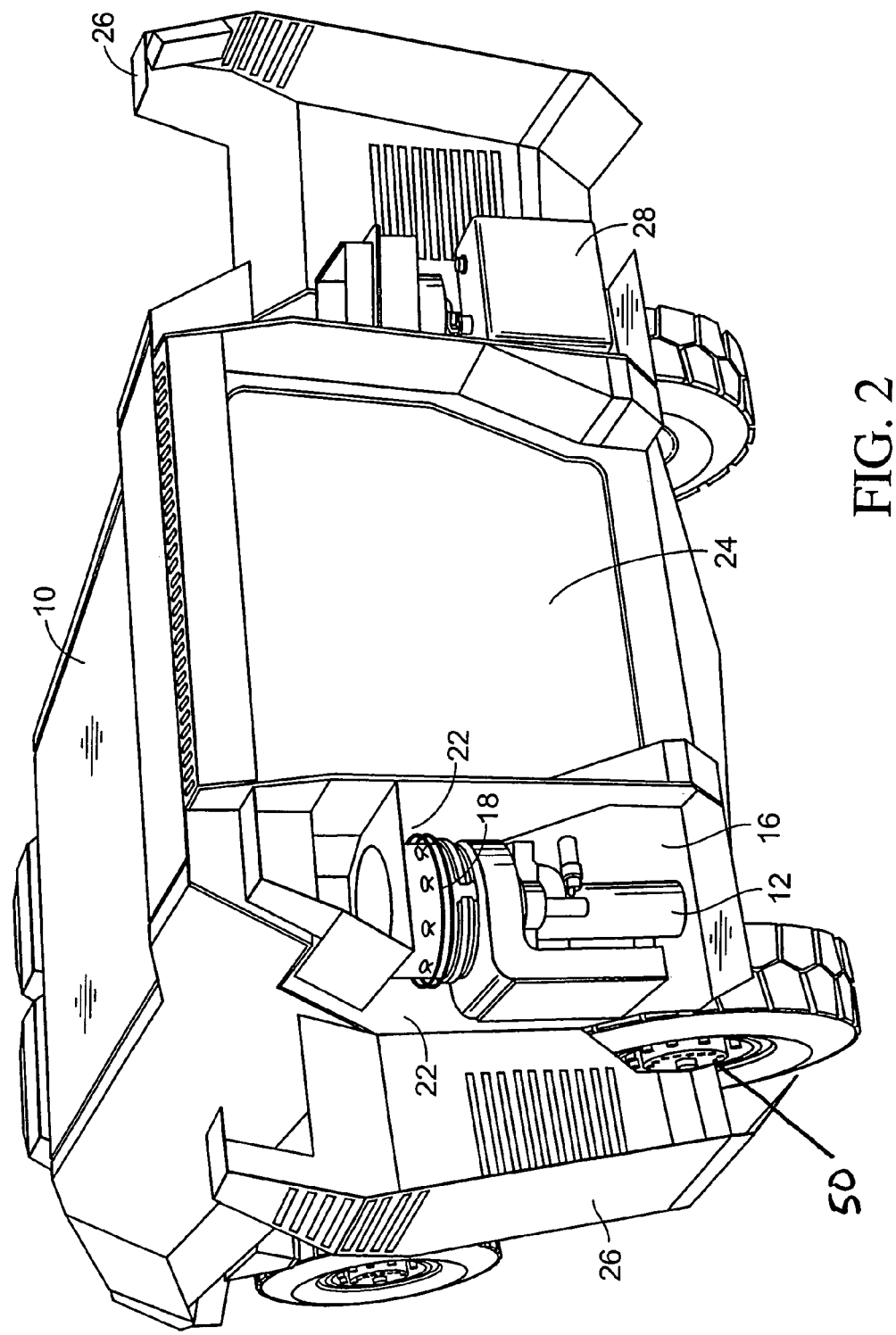
FIG. 2 is a rear perspective view of the vehicle having both an engine compartment access hatch and a related components compartment access hatch in an open disposition.

The present invention is a military vehicle 10 as illustrated in FIGS. 1 and 2 with a turbine engine 12 mounted on a first rear corner 14 of the vehicle. The turbine engine 12 is installed in an engine compartment 16. The engine 12 is installed at the rear of the vehicle 10 to provide the engine 12 with more protection than is available in a forward engine scheme, and to shield the crew from the noise, heat, exhaust, and moving parts of the engine 12.

The turbine engine 12 is oriented vertically, in order to reduce the critical space requirement. The turbine engine 12 powers an electrical generator 18 that is in communication with one or more electric drive motors schematically illustrated at 50 via a power cable. The electric drive motors of course drive the wheels 20 of the vehicle 10.

The engine compartment 16 is defined by a hull wall 22 that is open to both a lateral side and a rear side. This arrangement isolates the engine 12 from the personnel area 24 of the vehicle 10. The engine compartment 16 is covered by an access door 26 that swings open to allow easy and direct access to the engine 12 from outside the vehicle 10.

As illustrated in FIG. 2, a second compartment 28 is located on a second rear corner 15 opposite the engine compartment 16. In the preferred embodiment of the vehicle 10, the second compartment 28 is constructed as a mirror image of the engine compartment 16, the second compartment 28 being defined by a hull wall 22 that is open to both a lateral side and a rear side. The second compartment 28 is also covered by an access door 26. In the preferred embodiment, the supporting components for the turbine (e.g., oil cooler, heat exchanger, etc.) are mounted in the second compartment 28.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A vehicle comprising:
    an engine compartment located at an outer rear corner of said vehicle, said engine compartment being formed by a hull wall, said engine compartment being open on at least one side; such that
    a turbine engine that drives an electrical generator is contained in said engine compartment and is accessible from outside of said vehicle, and
    said engine compartment is separated from a personnel area by said hull wall, thereby shielding a crew of said vehicle from said engine.

2. The vehicle as defined in claim 1 wherein:
said engine compartment is covered by an access door.

3. The vehicle as defined in claim 1 wherein:
said engine compartment is open on both a lateral side and a rear side.

4. The vehicle as defined in claim 1 wherein:
said engine is installed in a vertical orientation, thereby reducing an amount of space required for said engine in said vehicle.

5. The vehicle as defined in claim 1 wherein:
said vehicle further comprises a second compartment located at a second outer rear corner of said vehicle, said second compartment being formed by a hull wall, and said second compartment being open on at least one side.

6. The vehicle as defined in claim 5 wherein:
said second compartment is covered by a second access door.

7. The vehicle as defined in claim 5 wherein:
said second compartment is open on both a lateral side and a rear side.

8. The vehicle as defined in claim 1, wherein the electrical generator is electrically connected to at least one electric drive motor for driving one or more wheels on said vehicle.

9. A military vehicle having improved engine survivability comprising:
a vehicle body having a personnel area, an engine compartment and a plurality of wheels, the engine compartment located on a first rear corner of the vehicle body and including an access door adapted to swing open and provide both side and rear access to a turbine engine, wherein the turbine engine drives the plurality of wheels.

10. The military vehicle of claim 9, wherein the vehicle body further comprises a second rear compartment located on a second rear corner of the vehicle body, the second rear compartment having a second access door adapted to swing open and provide both side and rear access to engine support components.

* * * * *